United States Patent [19]
Kramer

[11] 3,918,726
[45] Nov. 11, 1975

[54] FLEXIBLE SEAL RING

[76] Inventor: Jack M. Kramer, 1942 Corning St., Los Angeles, Calif. 90034

[22] Filed: Jan. 28, 1974

[21] Appl. No.: 437,533

[52] U.S. Cl. .............................. 277/227; 277/164
[51] Int. Cl.² ........................................ F16J 15/10
[58] Field of Search ........... 277/164, 165, 231, 227, 277/232, 235, 166, 181–186

[56] References Cited
UNITED STATES PATENTS

| | | | |
|---|---|---|---|
| 2,430,836 | 11/1947 | Taylor | 277/124 |
| 2,676,823 | 4/1954 | Olson et al. | 277/227 |
| 2,687,909 | 8/1954 | Blackman et al. | 277/235 |
| 3,408,038 | 10/1968 | Scaramucci | 277/231 |

Primary Examiner—Robert I. Smith
Attorney, Agent, or Firm—Edward A. Sokolski

[57] ABSTRACT

A flexible seal ring is formed from an elastomeric ring shaped member which has embedded therein a ring shaped insert. This insert is of a material flexible enough to permit handling and installation yet resistant to abrasion, extrusion and deformation and thus effectively provides a stiffener and an abrasion resistant portion of the ring. The insert may take various forms having portions extending along or adjacent to one or more of the sealing surfaces of the ring and may additionally include portions extending through the central portions of the ring away from the sealing surfaces to provide an anchor for the portions extending along the sealing surfaces.

13 Claims, 17 Drawing Figures

FLEXIBLE SEAL RING

This invention relates to flexible seal rings and more particularly to such rings having ring shaped inserts embedded therein for resisting deformation, extrusion and abrasion of the ring.

Elastomeric O-ring seals are used extensively to provide a seal between pipes, tubes and the like which are joined together. Such ring seals of the prior art have several shortcomings. This is in view of the fact that under dynamic conditions, i.e., where there is relative movement between the surfaces to be sealed, axial movement may repeatedly occur and result in abrasion of the outer surface of the ring which causes a peeling thereof. This condition is similar to galling in metal structures, and results in the rapid deterioration of the ring. Angular deflections, which create varying distances between the sealing ring and the surface to be sealed, can create a condition where the ring is forced by pressure into the space so created, resulting in severe distortion of the ring and in some instances causing the ring to be forced from its retaining groove and dislodged or extruded therefrom.

The device of this invention overcomes the aforementioned shortcomings of the prior art by providing a flexible elastomeric seal ring which is adapted to resist pressures which tend to extrude the seal into the clearance gap between the surfaces to be sealed and which is adapted to resist abrasive action resulting from axial movement of the sealing surfaces. This end result is achieved in the present invention by providing a material insert which is bonded to the elastomeric material of the seal ring, this insert being flexible enough to permit handling and installation, yet resistant to abrasion, extrusion and deformation caused by the forces of pressure and/or sliding movements and angular deflection.

It is therefore an object of this invention to provide an improved flexible seal ring better able to withstand abrasions resulting from axial movement of the sealing surfaces.

It is another object of this invention to provide a flexible seal ring capable of resisting pressures and movements tending to extrude the seal into spaces between the surfaces to be sealed.

It is still another object of this invention to provide an improved flexible seal ring capable of adapting to angular deflections which may occur between the surfaces to be sealed.

Other objects of this invention will become apparent as the description proceeds in connection with the accompanying drawings, of which:

Briefly described, the device of the invention comprises a flexible seal ring formed from elastomeric material in which is embedded a ring-shaped insert of a material such as fiberglas cloth which acts to reinforce the ring so that it has resistance to deformation and provides an abrasion resistant face portion at or near at least one of the sealing surfaces. In a preferred embodiment of the invention the insert has a portion thereof which runs adjacent to one of the sealing surfaces or actually forms such surface to provide resistance to abrasion, and in preferred embodiments, a stem portion which extends towards the center of the ring from the abrasion resistant surface, this stem portion acting to provide structural reinforcement.

Figure 1:
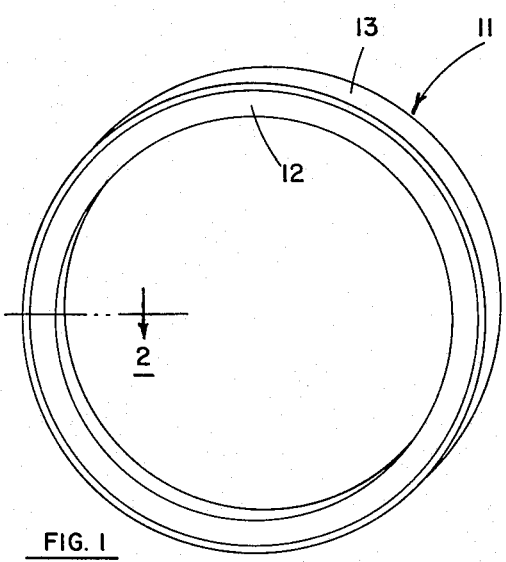
FIG. 1 is a perspective view of one embodiment of the invention.
Figure 2:
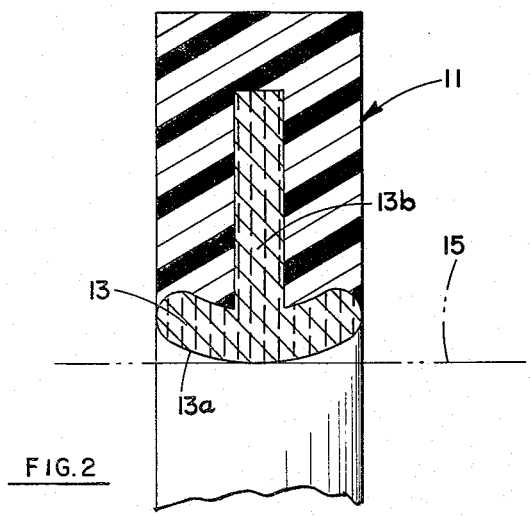
FIG. 2 is a cross sectional view taken along the plane indicated by 2—2 in FIG. 1.

Referring now to FIGS. 1 and 2, a first embodiment of the invention is illustrated. Flexible O-ring 11 is fabricated of an elastomeric ring portion 12 which may be of silicone rubber, in which is molded an insert member 13 of a material such as fiberglas cloth, which is resistant to abrasion and is stiff enough to resist deformation when pressure or twisting forces are applied to the ring, and yet which is flexible enough to permit handling and installation of the composite O-ring. Insert 13 includes an abrasion resistant surface 13a which forms one of the contact surfaces of the ring which seals against surface 15, and a stem portion 13b which extends away from surface 13a through the center of elastomeric portion 12.

O-ring 11 may be formed in the following manner: Insert 13 is first fabricated from a strip of fiberglas cloth which has been impregnated with the same elastomeric material used for forming elastomeric ring 12. The fiberglas cloth is cut into strips along the bias so that flexibility and elasticity or stretch is built into the part. The strips thus formed are covered on one side with a polyvinyl alcohol tape to about .003 inch thickness. The material is then folded in half with the tape portion on the outside and placed in a mold which is essentially a long bar having a slot therein which accepts the base of the folded material. With the rounded middle portion of the tape protruding from this slot, the material is firmly gripped by the sides of the slot and then the top of the folded section of the material covered by the tape is forced down in the part into a groove resembling the top of a "T". This forces the material to spread apart and to compress in the other direction so that a T is formed from one piece of material. After the material has been mashed flat, it is restrained in that configuration by another bar placed over it and securely fastened in position. In this T configuration, the bar is oven cured at approximately 300°F for 10-20 minutes and the part then removed from the mold. A small section of the T is cut at an angle of 30°-45° (for about ¼ inch) to provide a mitered overlap section. The tape is then removed from the insert and immediately thereafter the insert is laid in a mold for forming the elastomeric ring with the top of the T properly oriented, this mold already having elastomeric material therein. A second strip of elastomeric material is placed on the other side of the insert. The mold is then closed and the material cured at the prescribed temperatures for the particular elastomer utilized.

Figure 3:
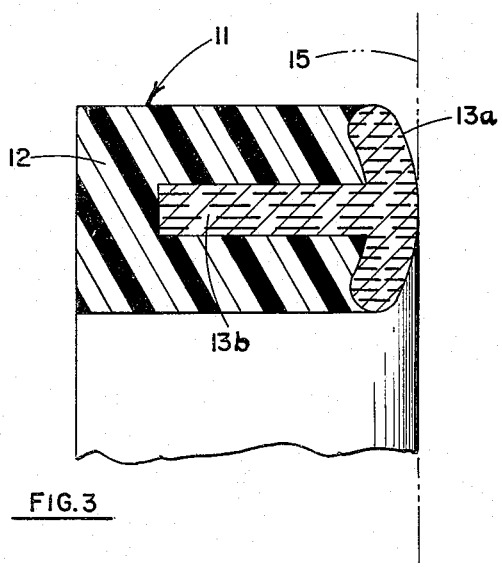
FIG. 3 is a cross sectional view of a still further embodiment of the invention.

Referring now to FIG. 3, another embodiment of the invention is illustrated. This embodiment is closely similar to that in FIGS. 1 and 2 except for the fact that the sealing surface 13a is on a different side of the seal from that of the first embodiment so as to provide an abrasion resistant interface with sealing surface 15.

Figure 4:
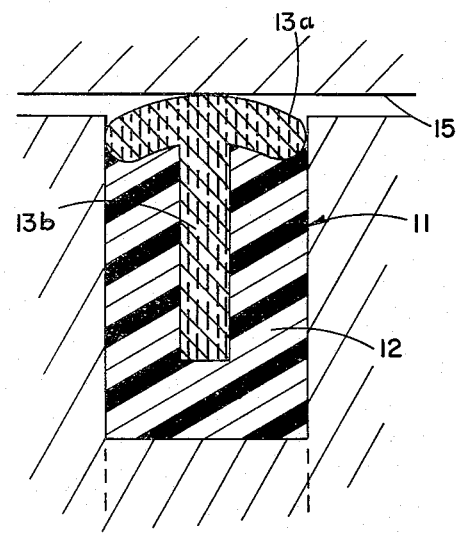
FIG. 4 is a cross sectional view of a further embodiment of the invention.

FIG. 4 illustrates still another embodiment of the invention similar to that of FIGS. 1-3, wherein abrasion resistant surface 13a is oriented along a side of the seal opposite that of the embodiment of FIG. 2, in this instance to provide a sealing surface for mating engagement with surface 15.

Figure 5:
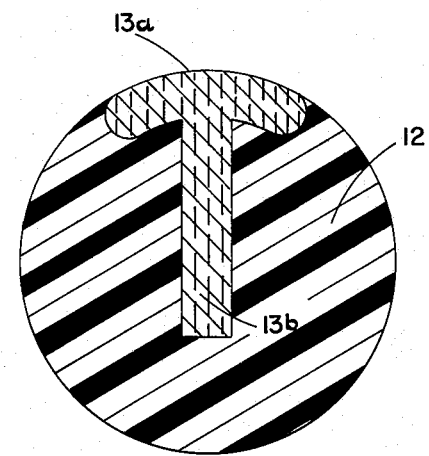
FIG. 5 is a cross sectional view of still another embodiment of the invention.

Referring now to FIG. 5, still another embodiment of the invention is illustrated. This embodiment differs from the previous embodiments in that the elastomeric ring portion 12 has a circular cross section rather than a rectangular cross section as for the previous embodiments. It is to be noted along these lines that various types of cross sections may be utilized for the seal, such as trapezoidal, square, rectangular, round or oval shapes as particular application requirements may dictate.

Figure 6:
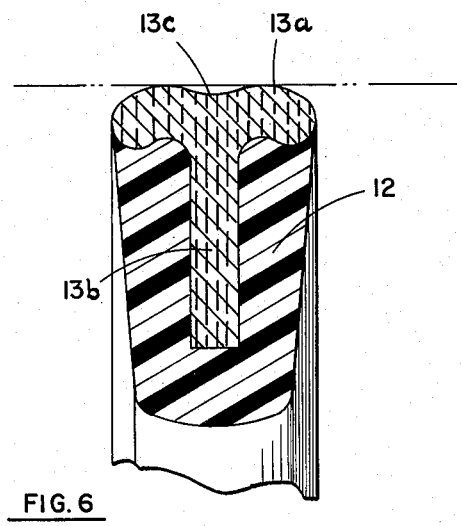
FIG. 6 is a cross sectional view of a further embodiment of the invention.

Referring now to FIG. 6, still another embodiment of the invention is illustrated. In this embodiment, elastomeric ring 12 has a trapezoidal cross section while the abrasion resistant surface 13a of the insert differs from that of the previous embodiments in that it has a groove 13c formed in the central portion thereof. This groove portion forms a sealing surface which in certain applications enhances the sealing action.

It is to be noted at this point that the stem portion 13b acts as an anchor for the portions of the T oriented parallel to sealing surface 13a, thus operating to anchor the bearing surface to the body of the seal. This provides resistance of the seal against compression, affords a stiffening action which resists twisting of the seal along its axis and improves stability of the seal against shock loading. A further advantage afforded by the stem portion is that the stem provides increased resistance to permanent deformation of the seal which tends to occur in prior art seals upon prolonged exposure to heat and pressure.

Figure 15:
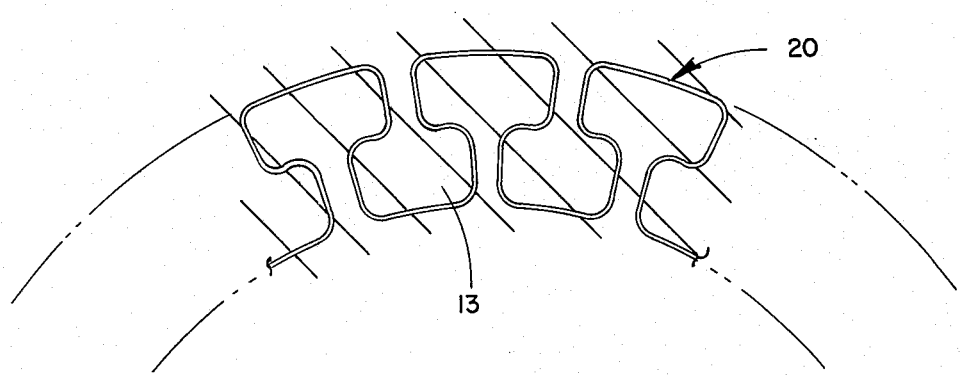
FIG. 15 is a cross sectional view taken along the plane indicated by 15—15 in FIG. 14.
Figure 14:
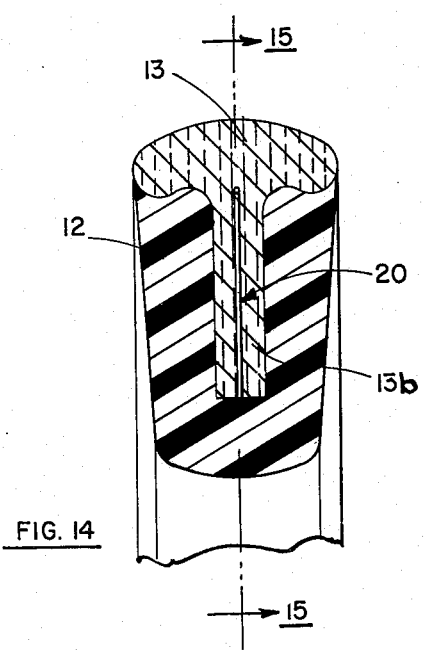
FIG. 14 is a cross sectional view of still another embodiment of the invention.

Referring now to FIGS. 14 and 15, a further embodiment of the invention is illustrated. In this embodiment, a wire spring 20 is incorporated in the stem portion 13b of the T. This wire spring is in the shape of a repetitive T pattern and forms a ring running through the center of the stem portion. The spring provides a constant sealing force which continues to be effective with aging and compression set of the elastomeric seal material.

Figure 17:
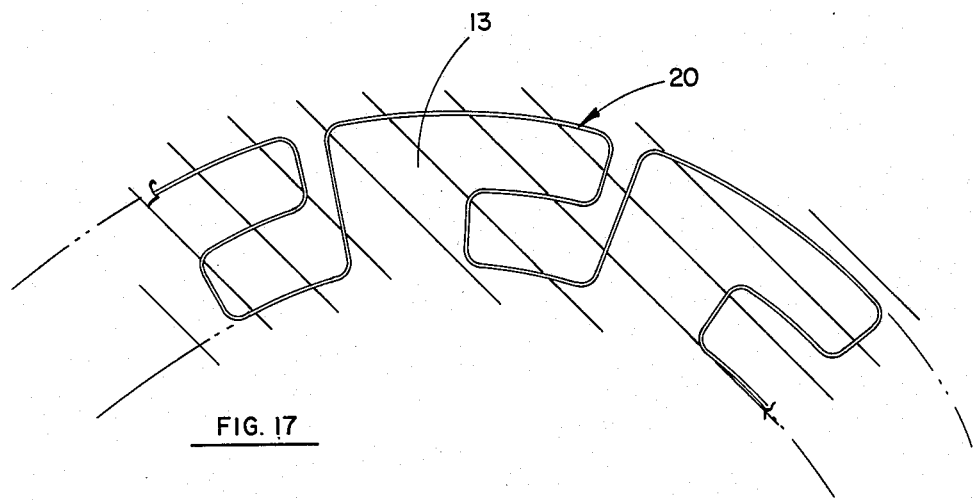
FIG. 17 is a cross sectional view taken along the plane indicated by 17—17 in FIG. 16.
Figure 16:
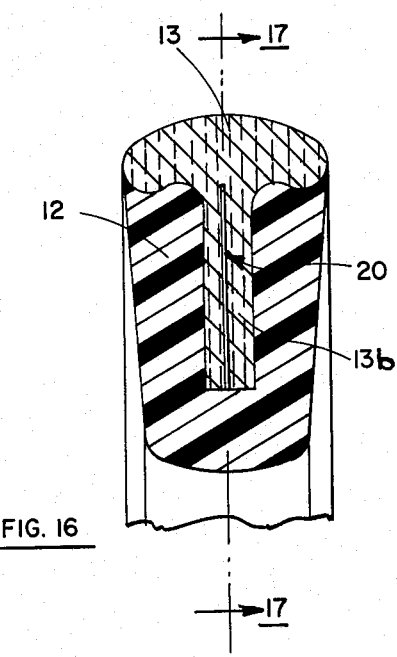
FIG. 16 is a cross sectional view of a further embodiment of the invention.

Referring now to FIGS. 16 and 17, another embodiment of the invention is illustrated, utilizing a spring 20 embedded in stem portion 13b. This embodiment is similar to the embodiment of FIGS. 14 and 15, but for the shape of the wire spring, which in this instance is in the shape of a repetitive key pattern rather than a T pattern.

Figure 7:
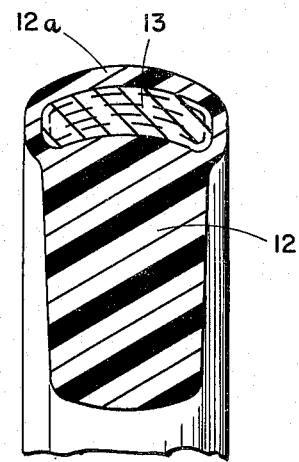
FIG. 7 is a cross sectional view of still another embodiment of the invention.

Referring now to FIG. 7, still another embodiment of the invention is illustrated. This embodiment utilizes an insert 13 which has no stem portion and includes only a strip portion which runs adjacent to the sealing surface 12a of elastomeric portion 12. Insert 13 does not form a sealing surface of the seal, but rather is fully embedded within elastomeric portion 12. This embodiment thus is simpler in configuration but does not have the reinforcement provided by the stem portion of the preceding embodiments, and further does not utilize the insert as an exposed abrasion resistant member but rather depends upon the insert for abrasion resistance if and when the elastomeric surface 12 wears down.

Figure 8:
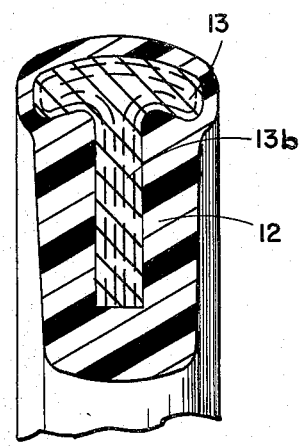
FIG. 8 is a cross sectional view of a further embodiment of the invention.

Referring now to FIG. 8, still another embodiment is illustrated. This embodiment differs from that of FIG. 7 in that insert 13 includes a stem portion 13b.

Figure 9:
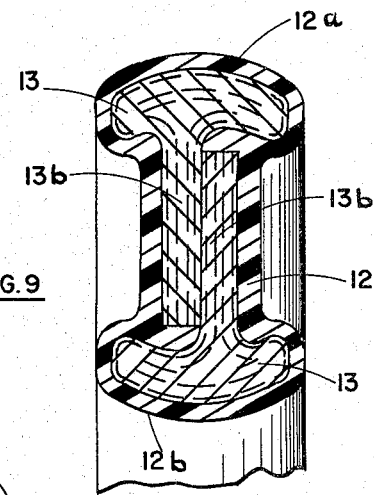
FIG. 9 is a cross sectional view of still another embodiment of the invention.

Referring now to FIG. 9, still another embodiment of the invention is illustrated. This embodiment utilizes a pair of insert members 13 symmetrically arranged in the elastomeric ring portion 12 with their stem portions 13a in juxtaposition, to provide reinforcing portions for a pair of sealing surfaces 12a and 12b.

Figure 10:
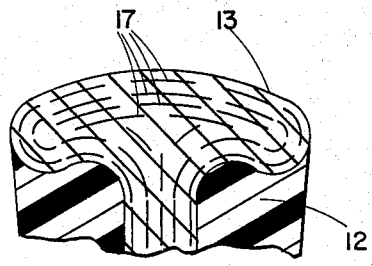
FIG. 10 is a partial view in section of still a further embodiment of the invention.

It is to be noted in certain instances it may be desirable to make the entire seal or a portion thereof electrically conductive to provide electrical grounding to avoid sparking which could cause an explosion hazard. This end result may be achieved by utilizing a cloth impregnated with graphite particles 17 for forming the insert 13, as illustrated in FIG. 10, or by other means such as incorporating metallic threads or the like in the insert, or placing a metallic cloth sheath over the insert.

Figure 11:
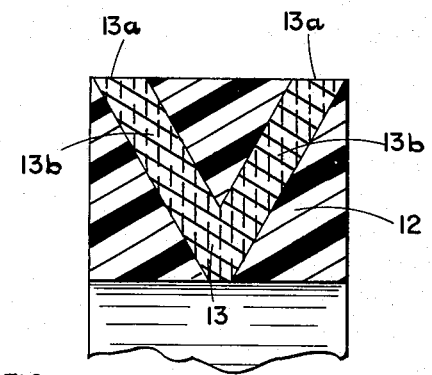
FIG. 11 is a cross sectional view of another embodiment of the invention.

Referring now to FIG. 11, still another embodiment of the invention is illustrated. In this embodiment, insert 13 is V-shaped with the ends 13a of the V forming at least a portion of the sealing surfaces, and the legs of the V forming the stem portions 13b.

Figure 12:
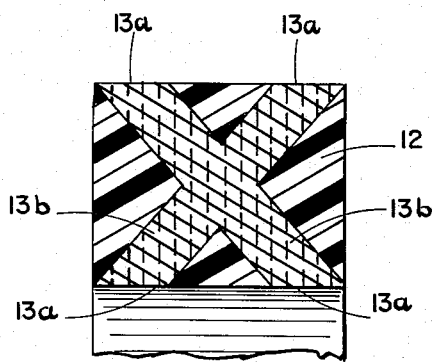
FIG. 12 is a cross sectional view of still a further embodiment of the invention.

Referring now to FIG. 12, still another embodiment of the invention is illustrated. In this embodiment, the inserts 13 are X-shaped, with the end portions 13a of the "X" forming the sealing surfaces, and the arm portions 13b of the X forming the stem portions. With this type of X-shaped insert, of course, it is possible to form abrasion resistant sealing portions 13a on opposite sides of the seal.

Figure 13:
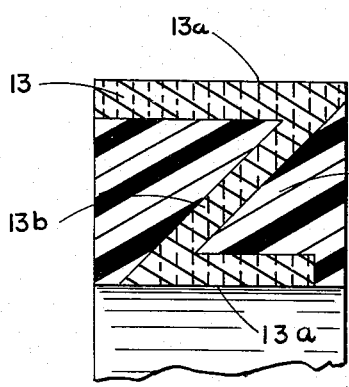
FIG. 13 is a cross sectional view of another embodiment of the invention.

Referring now to FIG. 13, still another embodiment of the invention is illustrated. In this embodiment, abrasion resistant surfaces 13a are provided by the top and bottom portions of a "Z" shaped insert 13, with the stem of the insert 13b being formed by the cross arms of the Z.

The device of the invention thus provides highly effective means for avoiding the shortcomings of prior art O-ring seals by utilizing an insert which is embedded in an elastomeric ring.

While the invention has been described and illustrated in detail, it is to be clearly understood that this is intended by way of illustration and example only and is not to be taken by way of limitation, the spirit and scope of this invention being limited only by the terms of the following claims.

I claim:

1. A flexible seal ring for forming a seal between two surfaces comprising:

a ring shaped elastomeric member, and a ring shaped insert member embedded in said elastomeric member to provide reinforcement of the elastomeric member against deformation and resistance against abrasion, said ring shaped insert member being T-shaped in cross section and having at least a portion thereof which runs adjacent to one of the sealing surfaces of said seal ring and a stem portion extending from the first mentioned portion towards the central portions of the elastomeric member.

2. The seal ring of claim 1 wherein a portion of said insert member forms a sealing surface of the seal ring.

3. The seal ring of claim 1 wherein the top of the "T" formed by said insert forms an abrasion resistant sealing surface, the stem of the "T" extending towards the central portions of said seal ring to form an anchor for the insert.

4. The seal ring of claim 1 wherein said insert is entirely surrounded by said elastomeric member.

5. The seal ring of claim 1 wherein said insert is formed from fiberglas cloth impregnated with elastomeric material.

6. The seal ring of claim 1 wherein said elastomeric member has a circular cross section.

7. The seal ring of claim 1 wherein said elastomeric member has a rectangular cross section.

8. The seal ring of claim 1 and further including a second insert member similar to the first insert member, said insert members being placed with the stem portions thereof in juxtaposition, the top portions of the T's being adjacent to opposite surfaces of the seal ring.

9. The seal ring of claim 1 and further including a wire spring embedded in said stem portion and running therearound to form a ring.

10. A flexible seal ring for forming a seal between two surfaces comprising:

a ring shaped elastomeric member, and a ring shaped insert member embedded in said elastomeric member to provide reinforcement of the elastomeric member against deformation and resistance against abrasion, said ring shaped insert member having a Z-shaped cross section with at least a portion thereof which runs adjacent to one of the sealing surfaces of said seal ring and a stem portion extending from the first mentioned portion towards the central portions of said elastomeric member.

11. A flexible seal ring for forming a seal between two surfaces comprising:

a ring shaped elastomeric member, and a ring shaped insert member embedded in said elastomeric member to provide reinforcement of the elastomeric member against deformation and resistance against abrasion, said ring shaped insert member having a V-shaped cross section at least a portion thereof which forms a portion of at least one of the sealing surfaces of said seal ring, the insert member having a pair of separated arm portions forming the arms of said V-shaped cross section.

12. A flexible seal ring for forming a seal between two surfaces comprising:

a ring shaped elastomeric member, a ring shaped insert member embedded in said elastomeric member to provide reinforcement of the elastomeric member against deformation and resistance against abrasion, said ring shaped insert member having at least a portion thereof which runs adjacent to one of the sealing surfaces of said seal ring and a stem portion extending from the first mentioned portion towards the central portions of the elastomeric member, and a wire spring in the shape of a repetitive T pattern embedded in said stem portion and running therearound to form a ring.

13. The seal of claim 12 wherein said wire spring is in the shape of a repetitive key pattern.

* * * * *